United States Patent
Thiesen

(10) Patent No.: US 7,224,100 B2
(45) Date of Patent: May 29, 2007

(54) REDUCING COUPLING OF RF INTERROGATED SAWS TO EXTERNAL BODIES

(75) Inventor: Jack Thiesen, Easley, SC (US)

(73) Assignee: Michelin Recherche et Technique S.A. (CH)

( * ) Notice: Subject to any disclaimer, the term of this patent is extended or adjusted under 35 U.S.C. 154(b) by 132 days.

(21) Appl. No.: 10/861,679

(22) Filed: Jun. 4, 2004

(65) Prior Publication Data

US 2005/0269902 A1 Dec. 8, 2005

(51) Int. Cl.
*H03H 9/125* (2006.01)
*H01L 41/08* (2006.01)

(52) U.S. Cl. .................................. 310/313 R
(58) Field of Classification Search ............... 29/25.35, 29/833; 310/334, 338, 313 B; 333/153; 73/754; *H01L 9/125; H03H 41/08*
See application file for complete search history.

(56) References Cited

U.S. PATENT DOCUMENTS

| | | | |
|---|---|---|---|
| 3,760,351 A | 9/1973 | Thomas | |
| 3,959,748 A * | 5/1976 | Subramanian | 310/313 R |
| 4,216,401 A * | 8/1980 | Wagner | 310/313 R |
| 4,510,484 A | 4/1985 | Snyder | |
| 4,862,486 A | 8/1989 | Wing et al. | |
| 5,237,235 A * | 8/1993 | Cho et al. | 310/313 R |
| 5,457,447 A | 10/1995 | Ghaem et al. | |
| 5,729,185 A * | 3/1998 | Johnson et al. | 310/313 R |
| 5,749,984 A | 5/1998 | Frey et al. | |
| 5,869,189 A | 2/1999 | Hagood, IV et al. | |
| 6,048,622 A | 4/2000 | Hagood, IV et al. | |
| 7,067,955 B2 * | 6/2006 | Higuchi et al. | 310/313 R |

FOREIGN PATENT DOCUMENTS

WO WO 0247924 A1 6/2002

* cited by examiner

*Primary Examiner*—Darren Schuberg
*Assistant Examiner*—Karen Beth Addison
(74) *Attorney, Agent, or Firm*—Dority & Manning, P.A.

(57) ABSTRACT

Disclosed is an apparatus and methodology for providing reduced coupling of radio frequency (RF) interrogated surface acoustic wave (SAW) based sensors to external bodies. Coupling, and therefore electrical loading of the sensor element, is reduced by providing an electrically conductive housing surrounding the SAW sensor element and by electrically coupling one terminal of the SAW sensor element to the electrically conductive housing. Electrical connection to an additional terminal of the SAW sensor element is provided by way of an electrically isolated connection through the electrically conductive housing.

5 Claims, 2 Drawing Sheets

REDUCING COUPLING OF RF INTERROGATED SAWS TO EXTERNAL BODIES

FIELD OF THE INVENTION

The present subject matter concerns SAW based devices for use as embedded sensors. More particularly, the present subject matter concerns enhancements to such devices; especially SAW based device that addresses operational statistical dispersion among such devices to ensure uniform operation.

BACKGROUND OF THE INVENTION

The incorporation of electronic devices with pneumatic tire and wheel structures yields many practical advantages. Tire electronics may include sensors and other components for relaying tire identification parameters and also for obtaining information regarding various physical parameters of a tire, such as temperature, pressure, tread wear, number of tire revolutions, vehicle speed, etc. Such performance information may become useful in tire monitoring and warning systems, and may even potentially be employed with feedback systems to regulate proper tire parameters.

Yet another potential capability offered by electronics systems integrated with tire structures corresponds to asset tracking and performance characteristics for commercial vehicular applications. Commercial truck fleets, aviation craft and earth mover/mining vehicles are all viable industries that could utilize the benefits of tire electronic systems and related information transmission. Radio frequency identification devices (RFID) can be utilized to provide unique identification for a given tire, enabling tracking abilities for a tire. Tire sensors can determine the distance each tire in a vehicle has traveled and thus aid in maintenance planning for such commercial systems. Vehicle location and performance can be optimized for expensive applications such as those concerning earth-mining equipment.

One particular type of sensor, or condition-responsive device, that has recently become desirable for use in certain tire electronics systems to determine various parameters related to tire or wheel assembly is an acoustic wave device, such as a surface acoustic wave (SAW) device. SAW devices have desirable properties for certain sensor applications since they are sensitive, use very little power, and can be operated at RF frequencies convenient for relaying information in a wireless fashion. SAW devices may include at least one resonator element made up of interdigitated electrodes deposited on a piezoelectric substrate.

When an electrical input signal is applied to a SAW device, selected electrodes cause the SAW to act as a transducer, thus converting the input signal to a mechanical wave in the substrate. Other structures in the SAW reflect the mechanical wave and generate an electrical output signal. In this way, the SAW acts like an electromechanical resonator. A change in the output signal from a SAW device, such as a change in frequency, phase and/or amplitude of the output signal, corresponds to changing characteristics in the propagation path of the SAW device. In some SAW device embodiments, monitoring device frequency and any changes thereto provide sufficient information to determine parameters such as temperature and strain to which a SAW device is subjected.

Additional background information regarding RFID technology and SAW devices may be had by reference to co-pending, commonly owned U.S. patent application Ser. No. 10/697,576, filed Oct. 30, 2003, entitled "Acoustic Wave Device With Digital Data Transmission Functionality" incorporated herein for all purposes.

In conventional implementations of SAW devices in tire-related applications, SAW sensors transmit information about the parameters being sensed. However, it is often the case that in radio frequency transmission systems, especially low power systems, environmental conditions occasioned by the placement of the subject devices in operating environments present previously unrecognized and unaddressed problems. While various implementations of acoustic wave devices such as SAW sensors in tire electronic systems have been developed, and while various combinations of information have been wireless relayed from tire or wheel assemblies using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for reducing variations in SAW based devices has been developed. It should be noted that although the principle portion of the remainder of the present disclosure may refer to the use of SAW based devices as being integrated with a tire or wheel structure, such use is not intended to represent a limitation of the present technology as, in fact, such SAW devices may be used in combination with a variety of other devices or elements or even as stand alone environmental sensors.

In an exemplary configuration, SAW based devices may include an acoustic wave device connected as a feedback element in an oscillator/amplifier and may be further coupled to an antenna element, thus forming an active transmitter arrangement. The acoustic wave device determines the carrier frequency (or frequencies) produced by such an active transmitter, therefore the frequency (or frequencies) of the transmitted RF signal represents one or more sensed parameters with the acoustic wave device itself functioning as a sensor. At the same time, the transmitted signal amplitude may be controlled by means of a separate circuit connected to the oscillator/amplifier.

In one of their simpler forms, the transmitted signal from a SAW based device is switched on and off in a timed sequence, but other amplitude modulation methods are possible. Positive aspects of this information transmission methodology include circuit simplification and power savings. For example, instead of requiring the circuitry in the tire to measure the sensed parameters, convert them to digital format, and encode them in a transmitted digital stream, the sensed parameter information is conveyed through the transmitted RF frequency. Such methodology provides for the transmission of any other information desired, however complex or simple, by amplitude modulation of the transmitted signal. Such a circuit configuration provides for the ability to actively transmit a combination of information from integrated tire electronics to a remote receiver location. The combination of information may correspond to the physical parameters sensed by the acoustic wave device as well as digital data superimposed on the RF signal emitted by the acoustic wave device by selectively switching the amplifier on and off.

Another positive aspect of this type of SAW device is that versatility is afforded to the types of information that can be transmitted via the electronics assemblies. Such information can include sensed information relating to parameters such as temperature and pressure associated with a tire or wheel assembly. Other information may include selected combinations of a unique tag identification, distance traveled, number of tire revolutions, vehicle speed, amounts of tread wear, amounts of tire deflection, the amount of static or dynamic forces acting on a tire, etc. So many different types of information are possible in part because a microcontroller can be configured to modulate any type of desired data on the RF output signal(s) from the electronics assembly and the subject external coupling reduction methodologies are able to minimize effects occasioned by placement of SAW based devices in close proximity to, or internally of, tire structures, wheel structures, or other elements or devices.

Having recognized the above mentioned positive aspects associated with SAW based devices, the present subject matter recognizes and addresses the fact that there are, nevertheless, negative aspects associated with such devices. Significant among these aspects is the extremely low power level at which the SAW devices transmit signal energy. While such low signal levels may be considered a positive aspect when considering operational energy requirements, these low levels, coupled with other aspects present challenges to data reception, recovery and accuracy. More specifically, operation of SAW based SAW devices at such low signal level, coupled with often hostile operating conditions and environments, may produce such a low signal level that it may be easily effected by external conditions and elements in close proximity to the devices so that the accuracy of the reported sensed data may be compromised.

In accordance with aspects of certain embodiments of the present subject matter, methodologies have been developed to lessen the influence of external conditions and proximal objects on the accuracy of SAW based devices. More particularly, methodologies have been developed to lessen observed operational statistical dispersions from one SAW based device to another such device occasioned by incorporating such devices in, on, or near tire structures or other housings, containers, or structures or elements.

In accordance with certain aspects of other embodiments of the present subject matter, methodologies have been developed to lessen any influence from external conditions and elements on the accuracy of signal frequency reported data from SAW based devices where the SAW elements function as sensors and antenna elements are directly coupled to the SAW sensor.

In accordance with yet still further aspects of other embodiments of the present subject matter, methodologies have been provided to lessen the electrical loading that may be placed on SAW sensors from external conditions and elements resulting from the direct connection of antenna elements to the SAW sensors.

Additional aspects of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
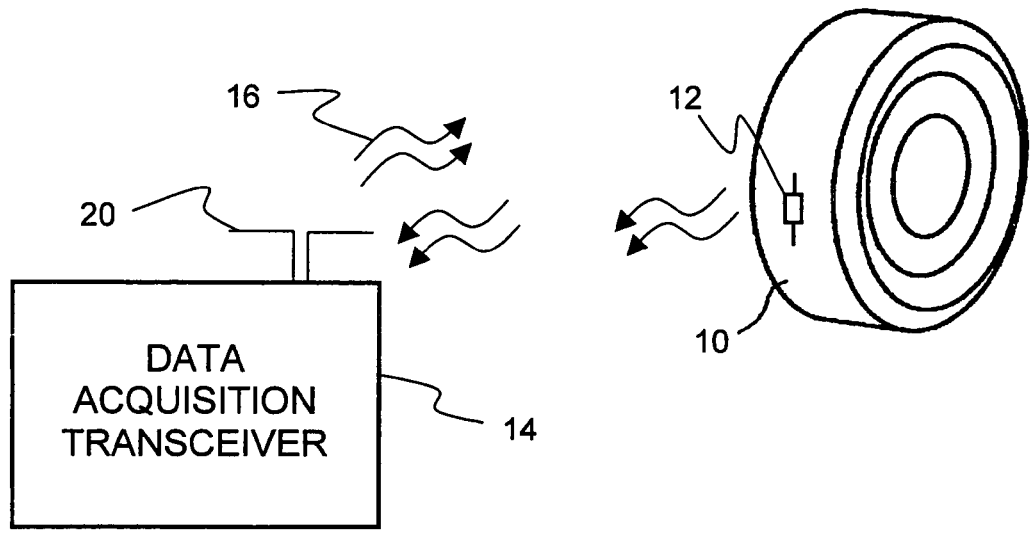
FIG. 1 diagrammatically illustrates an operational relationship between a SAW based device mounted in a tire structure according to known practices.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with methodologies for reducing the influence of external conditions and proximal objects on the accuracy of SAW based devices. More particularly, methodologies have been developed for reducing coupling of radio frequency (RF) interrogated SAW devices to external bodies.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar functions.

Reference will now be made in detail to the presently preferred embodiments of the subject electronics assemblies. Referring now to the drawings, FIG. 1 illustrates aspects of a known tire monitoring system with a passively operating electronics assembly, including a condition-responsive device, such as a surface acoustic wave (SAW) sensor. Tire structure 10 may incorporate a condition-responsive device 12 to monitor various physical parameters such as temperature or pressure within the tire or associated wheel assembly. Such a condition-responsive device may include at least one resonator-type sensor, such as a surface acoustic wave (SAW) resonator or a bulk acoustic wave (BAW) resonator. It should be appreciated in accordance with the present technology that a condition-responsive device can correspond to either of these specific types of sensors or to any commercially available acoustic wave sensor or other type of sensor that is resonant at a suitable frequency or frequencies. The passively operating assembly with condition-responsive device 12 of FIG. 1 may be energized by a remote source. Thus, a data acquisition transceiver 14 is typically provided with both transmitter and receiver electronics to communicate with the condition-responsive device 12. RF pulses 16 transmitted from the antenna 20 of the transceiver 14 to the electronics assembly in tire 10 excite the SAW device, which may then store some of this energy and transmit a signal back to the transceiver at the end of each energizing RF pulse.

Referring still to FIG. 1, transceiver 14 transmits an interrogation signal 16 that is intended to energize a given condition-responsive device 12 at its frequency of natural oscillation (resonant frequency) such that after an excitation pulse, each resonator element in condition-responsive device 12 radiates energy stored during excitation. Peak levels of this radiated energy occur at the respective resonant frequencies of the resonator elements in the condition-responsive device 12. Such signals are then received at the transceiver 14. By monitoring changes in the frequency of the signal transmitted back from condition-responsive device 12, information corresponding to preselected condition(s) within tire structure 10 can be determined.

Figure 2:
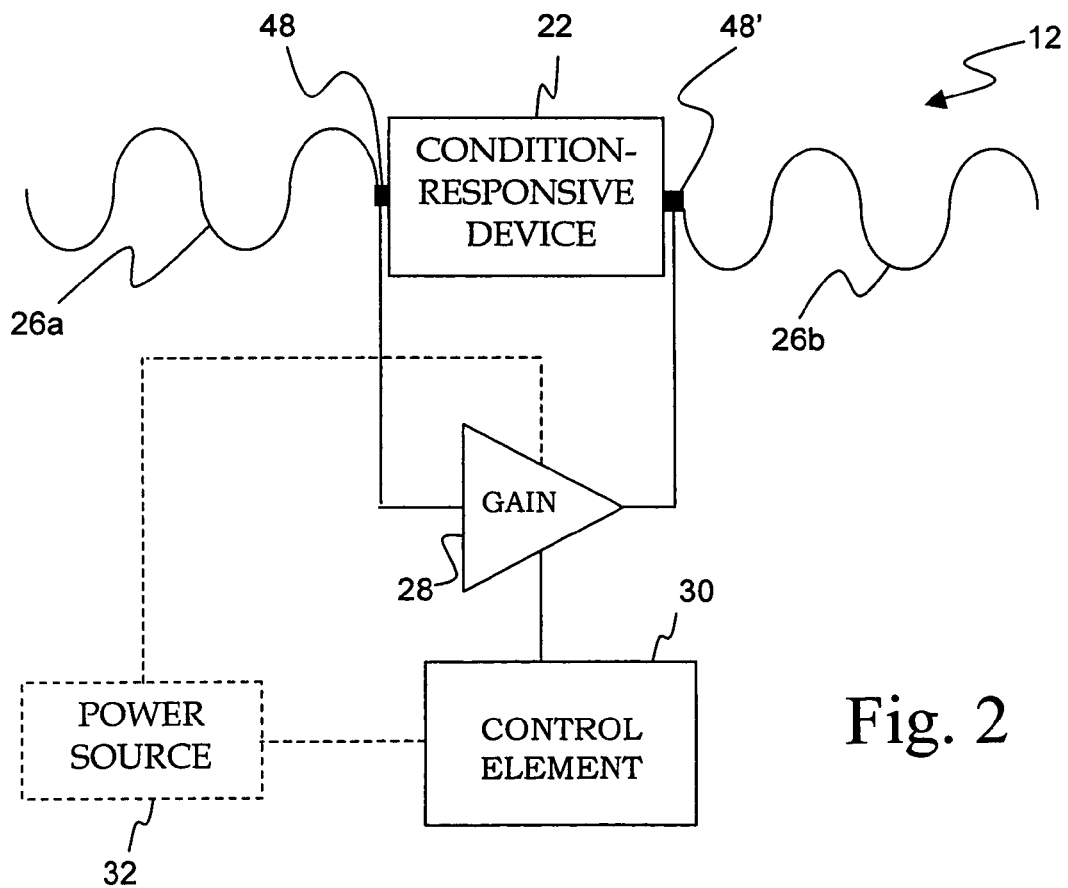
FIG. 2 illustrates a basic configuration of a SAW based device upon which the methodologies of the present subject matter may be applied.

In accordance with aspects of the present invention, an electronics assembly may be provided that relays information in addition to the parameters sensed merely by the condition-responsive device itself. Referring now to FIG. 2, an electronics assembly 12 for monitoring predetermined conditions within a tire structure or corresponding wheel assembly is illustrated. Electronics assembly 12 may be provided in conjunction with a tire structure in a variety of fashions. For instance, electronics assembly 12 may be attached to the interior of a tire structure or some other location relative to a wheel assembly. Alternatively, electronics assembly 12 may be embedded within a tire structure itself. Still further, electronics assembly 12 may be encased in an elastomer material with appropriate dielectric properties that may then be adhered to or embedded within a tire structure. The electronics assembly 12 may also be packaged in any number of ways and may be attached to the wheel assembly, the valve stem, or in any other place which allows for substantially accurate measurement of environmental conditions such as temperature and pressure as associated with the tire. In accordance with the variety of possible locations for electronics assembly 12, it will be appreciated in accordance with the present subject matter that an electronics assembly "integrated" with a tire structure or wheel assembly is intended to encompass all such possible locations and others as within the purview of one of ordinary skill in the art.

Electronics assembly 12 preferably includes a condition-responsive device 22, such as a sensor based on acoustic wave technology, which is capable of sensing various information about given tire conditions, such as temperature and pressure. A specific example of a condition-responsive device for use in accordance with embodiments of the present invention is a SAW device as developed by TRANSENSE TECHNOLOGIES, PLC. Specific aspects of such a SAW device are disclosed in published U.S. patent application Ser. No. 10/057,460, which is incorporated herein by reference for all purposes. Such a SAW device includes at least three resonator elements, each operating at a different resonant frequency. One specific example of three different resonant frequencies that may be simultaneously radiated for a given combination of environmental conditions is 433.28 MHz, 433.83 MHz, and 434.26 MHz. Each resonance shifts slightly in response to one or more parameters being sensed. Three resonator elements in combination yield a condition-responsive device that provides sufficient information to determine both the temperature and pressure levels in a tire. The resonant frequencies for such multiple resonator elements are preferably designed such that the distance between adjacent resonant frequencies is always greater than the resonator bandwidths at any pressure or temperature condition within a tire.

Condition-responsive device 22 may be configured as a single port device with two or more physical connection points 48, 48' to the single port. A gain circuit 28 is connected to the condition-responsive device's input port via such electrical connections. The combination of condition-responsive device 22 and gain circuit 28 forms an oscillator circuit. The condition-responsive device 22 forms the feedback element required for operation of the oscillator. The gain circuit 28 is configured to provide a sufficient amount of amplification such that the overall loop gain is greater than or equal to one, thus ensuring positive feedback and effective oscillator operation. The gain circuit is also designed such that the total phase shift through gain circuit 28 and condition-responsive device 22 is an integer multiple of three-hundred-and-sixty (360) degrees, thus leading to simultaneous oscillation of each resonator element in condition-responsive device 22. Gain circuit 28 may be designed to have many various circuit configurations, and may be provided by a single amplifier element (such as an operational amplifier, a field-effect transistor (FET), a bipolar junction transistor (BJT), or other type of transistor) or by an integrated circuit such as one including an amplifier element in selective combination with other active and/or passive components such as but not limited to resistors, inductors, diodes, capacitors, transistors and others as required to implement a combination of positive feedback and appropriate phase shift as required for effective oscillation. An additional exemplary configuration for the oscillator embodied by gain circuit 28 and condition-responsive device 22 is a Colpitts oscillator, as is well known to those of ordinary skill in the art.

An antenna may also be connected to the input port of condition-responsive device 22 to facilitate the transmission of output signals there from. By coupling the oscillator formed by condition-responsive device 22 and gain circuit 28 to an antenna, a transmitter is formed. For instance, two antenna wires 26a and 26b may be provided in combination to serve as a dipole antenna for the condition-responsive device 22. Antenna wires 26a and 26b may have respective straight or curved configurations and lengths that are optimized for desired radiation performance. It should be appreciated in accordance with the present subject matter that utilization of other antenna configurations, such as monopole antennas, loop antennas, helical antennas, or others as within the purview of one of ordinary skill in the art, is within the spirit and scope of the present invention.

Referring still to FIG. 2, a control element 30 may also be connected to gain circuit 28 to provide a means for selectively switching the oscillator on and off, thus superimposing a digital data stream on the RF signal radiated from the antenna embodied by antenna elements 26*a* and 26*b*. By selectively controlling operating power to the gain circuit 28, data is effectively modulated at the condition-responsive device 22. The control element 30 providing such ON/OFF modulation may correspond to a microcontroller with optionally varied degrees of functionality. Specific information may be stored in onboard memory associated with a microcontroller and an output signal indicative of such specific information may be coupled to the input of gain circuit 28 to modulate that specific data on the RF signals radiated by condition-responsive device 22. In other embodiments of the present invention, control element 30 may correspond to a radio frequency identification (RFID) chip. RFID chips often include their own microcontroller that can be employed to selectively control the connection between control element 30 and gain circuit 28. An RFID microcontroller may be characterized by limited functionality and thus provision of an additional control element in such instances is within the spirit and scope of embodiments of the present invention.

As previously mentioned, an aspect of the present technology is that the subject SAW based assemblies may transmit a combination of information. A data signal radiated from exemplary electronics assembly 12 may carry two independent streams of information. The first stream of information is the digital information effected by an ON/OFF modulation provided via the coupling from control element 30 to gain circuit 28. The second stream of information is determined by the resonant frequencies of the condition-responsive device 22 (which depend on the physical parameters being sensed.)

As previously mentioned, in some configurations, condition-responsive device 22 may include a plurality of resonator elements each configured to operate at a slightly different resonant frequency and each of those frequencies will vary slightly depending on the state(s) of the physical condition the sensor is monitoring. By monitoring the values of these distinct resonant frequencies, information concerning temperature, pressure, or other conditions associated with a tire can be interpolated. For instance, in one exemplary SAW sensor embodiment having three respective resonator elements, one resonant frequency can be interpolated to represent a given pressure value and a temperature value can be interpreted from a differential of the other two resonant frequencies.

Referring again to FIG. 2, electronics assembly 12 may optionally be configured as an active assembly, whereby a power source 32 may be provided to power selected elements of the assembly 12, such as the gain circuit 28 and the control element 30. In some embodiments, power source 34 may be a battery, such as but not limited to a rechargeable battery. In other embodiments, power source 34 may be an internal power generation device such as one that includes piezoelectric elements configured to convert mechanical energy from tire rotation to electrical energy that may then be stored therein. An example of a power generation device for utilization with the present subject matter is disclosed in currently pending U.S. patent application Ser. No. 10/143,535, entitled "System and Method for Generating Electric Power from a Rotating Tire's Mechanical Energy Using Piezoelectric Fiber Composites," which is incorporated by reference herein for all purposes. In other applications where a power source 32 is not provided as an integrated component of electronics assembly 12, power may be inductively coupled from a wheel well to the electronics assembly in a tire or rectified RF power may alternatively be utilized. It should be appreciated that any type of specific power source may be employed, while still remaining within the spirit and scope of the present subject matter.

Figure 3:
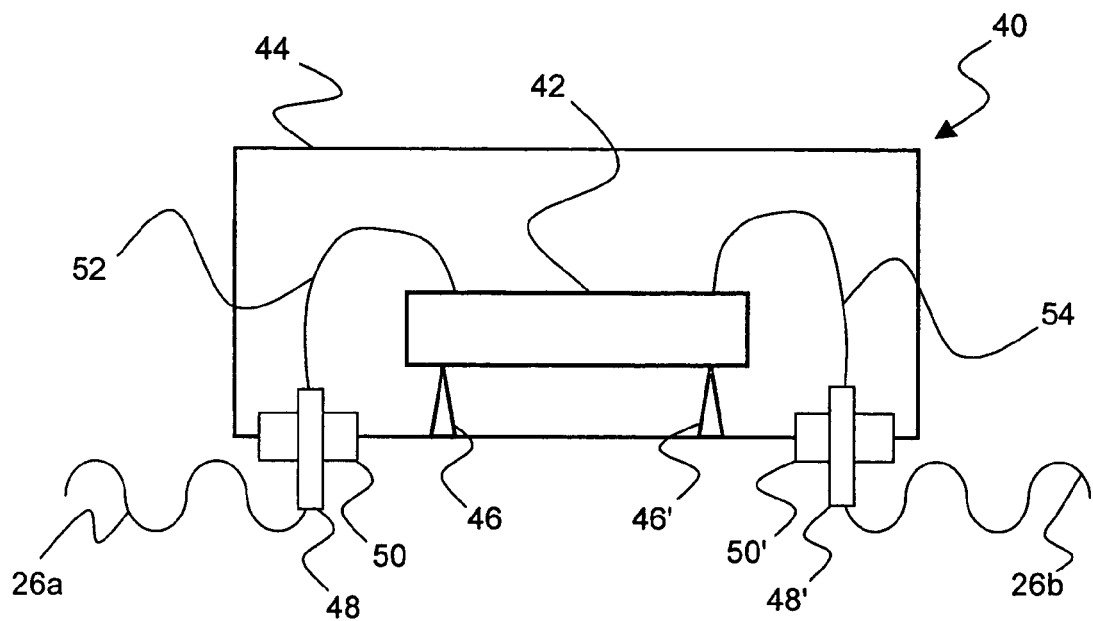
FIG. 3 illustrates an exemplary configuration of a presently known basic housing configuration of a SAW based device.

With reference to FIG. 3, there is illustrated an exemplary configuration of a known tire pressure monitoring system (TPMS) sensor 40 of a type similar to the temperature and pressure monitoring acoustic wave type devices discussed previously. In an exemplary arrangement, TPMS sensor 40 illustrated in FIG. 3 includes a SAW device 42 mounted inside a metallic housing 44 by way of stand-off mounting posts 46, 46'. To provide electrical connection for antenna elements 26*a*, 26*b* as well as other components of the monitoring system to the SAW sensor 42, a pair of electrically conductive metal feed thru pins 48, 48' are inserted by way of dielectric glass seals 50, 50' through one wall of the metallic housing 44. Connecting wires 52, 54 couple ends of the metallic pins 48, 48' interior to the metallic housing 44 to appropriate terminals on the SAW sensor 42 to complete electrical connections to antenna elements 26*a*, 26*b*.

The feed thru pin arrangement of the currently known tire pressure monitoring system sensor 40 illustrated in FIG. 3 electrically floats with respect to the package. That is, there is no fixed relationship of the voltages between the feed thru pins and the housing containing the sensor 40. This electrical floating has been found to contribute to the loading effect on, and consequent frequency shifting of, the SAW sensor. As previously discussed, such loading has been found to produce an increase in the statistical dispersion of tire pressure monitoring systems containing SAW based sensors when considering the differences between measurements made of the SAW devices in free space versus measurements made after the sensors have been placed in their operational environments, for example in tire structures or wheel assemblies.

Figure 4:
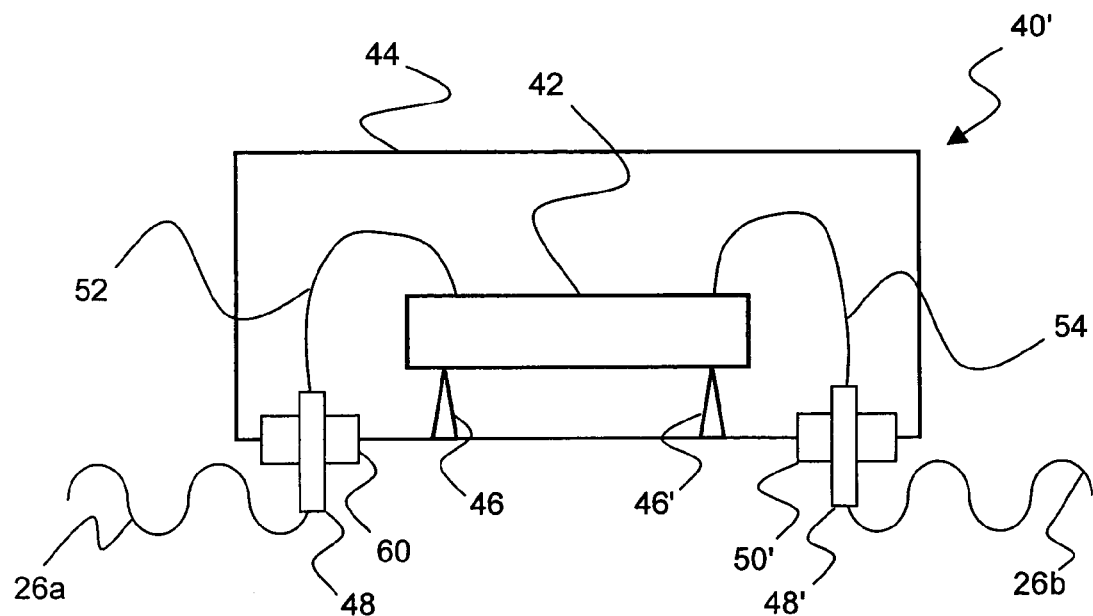
FIG. 4 illustrates an exemplary application of the present subject matter to a SAW based housing and device similar to that illustrated in FIG. 3.

To address this loading effect, the methodology of the present subject matter provides a technique for reducing the loading effect previously encountered which technique eliminates coupling effects to the SAWs themselves through the tire and proximate surrounding bodies. More specifically, as illustrated in FIG. 4, the previously known tire pressure monitoring system sensor 40 illustrated in FIG. 3 has been modified and is illustrated in FIG. 4 as tire pressure monitoring system sensor 40'. As illustrated in FIG. 4, substantially all of the previously illustrated components of FIG. 3 have been retained in the exemplary embodiment of the present subject matter illustrated in FIG. 4, as indicated by references characters similar to those of FIG. 3, with the exception of dielectric glass seals 50.

According to the present subject matter, the dielectric glass seal 50 illustrated in FIG. 3 has been replaced with a metal-to-metal seal 60. Such a seal 60 accomplishes two purposes. First, it provides a convenient replacement for the previously used dielectric glass seal that allows continued use of the known metallic housing without modification as a suitable housing for the SAW sensor of the present subject matter. Secondly, and more to the point of the present subject matter, the use of a metal-to-metal seal 60 with the feed thru pin 48 provides a direct electrical connection of one segment 26*a* of the antenna to the metallic housing 44. It should be noted that, although the use of a metal-to-metal seal 60 as illustrated in FIG. 4 represents a convenient format for that particular embodiment of the present subject matter, such format is not limiting to the present technology. As should be apparent to those of ordinary skill in the art, the housing 44 may, in fact, be modified in any manner desired to provide an electrical connection of one side of the antenna to a metallic housing 44 that shields the SAW as well as to the SAW element to bring about the benefits derived from reducing loading of the SAW element in accordance with the present subject matter. Thus an alternative embodiment of the present subject matter may not employ a metal-to-metal seal at all, but rather any other suitable electrical connection technique may be employed. Such as bonding the fed thru lead to the package internally.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of reducing coupling of radio frequency (RF) interrogated surface acoustic wave (SAW) based sensors to external bodies, comprising the steps of:

providing a surface acoustic wave sensor element, said surface acoustic wave sensor element having first and second electrical terminals;

providing an electrically conductive housing;

providing a feed through electrical connection pin having first and second end portions, the second end portion passing through a portion of the electrically conductive housing;

providing electrical isolation between the feed through electrical connection pin and the electrically conductive housing;

connecting the second end portion of the feed through electrical connection pin to the first electrical terminal of the surface acoustic wave sensor element;

connecting the second electrical terminal of the surface acoustic wave sensor element to the electrically conductive housing;

providing an antenna element having first and second end portions; and connecting the first end portion of the antenna element to the first end portion of the feed through electrical connection pin.

2. The method of claim 1, wherein the step of providing electrical isolation comprises providing a dielectric glass seal surrounding a portion of the feed through electrically conductive pin.

3. The method of claim 1, wherein the step of connecting the second electrical terminal of the surface acoustic wave sensor to the electrically conductive housing comprises connecting the second electrical terminal of the surface acoustic wave sensor to an internal surface of the electrically conductive housing.

4. The method of claim 2, wherein the step of connecting the second electrical terminal of the surface acoustic wave sensor to the electrically conductive housing comprises the steps of:

providing a second feed through electrical connection pin having first and second end portions, the second end portion passing through a portion of the electrically conductive housing;

providing electrical coupling between a portion of the second feed through electrical connection pin and the electrically conductive housing; and connecting the second end portion of the second feed through electrical connection pin to the second electrical terminal of said surface acoustic wave sensor.

5. The method of claim 2, wherein the step of providing electrical coupling comprises providing a metal-to-metal seal surrounding a portion of the second electrically conductive pin.

* * * * *